United States Patent
Armange (10) Patent No.: US 10,145,260 B2
(45) Date of Patent: Dec. 4, 2018

(54) ACCESSORY DRIVE CASE FOR A TURBOPROP

(71) Applicant: SAFRAN AIRCRAFT ENGINES, Paris (FR)

(72) Inventor: Frantz Armange, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 344 days.

(21) Appl. No.: 14/896,263

(22) PCT Filed: Jun. 4, 2014

(86) PCT No.: PCT/FR2014/051321
§ 371 (c)(1),
(2) Date: Dec. 4, 2015

(87) PCT Pub. No.: WO2014/195632
PCT Pub. Date: Dec. 11, 2014

(65) Prior Publication Data
US 2016/0138414 A1    May 19, 2016

(30) Foreign Application Priority Data

Jun. 6, 2013  (FR) ..................................... 13 55240
Jun. 6, 2013  (FR) ..................................... 13 55241

(51) Int. Cl.
*F01D 15/12*   (2006.01)
*F02C 7/32*    (2006.01)
(Continued)

(52) U.S. Cl.
CPC ............ *F01D 15/12* (2013.01); *F01D 25/24* (2013.01); *F02C 7/32* (2013.01); *F16H 1/222* (2013.01);
(Continued)

(58) Field of Classification Search
CPC .. F01D 15/12; F01D 25/24; F02C 7/32; F02C 7/36; F16H 1/222; F16H 1/225;
(Continued)

(56) References Cited

U.S. PATENT DOCUMENTS 1,832,111 A   11/1931  George
4,068,470 A    1/1978  Sargisson et al.
(Continued)

FOREIGN PATENT DOCUMENTS

CA   2 516 700 A1   9/2004
DE   2 040 474      2/1971
(Continued)

OTHER PUBLICATIONS

International Search Report dated Nov. 17, 2014 in PCT/FR14/051321 Filed Jun. 4, 2014.
(Continued)

*Primary Examiner* — Aaron R Eastman
(74) *Attorney, Agent, or Firm* — Oblon, McClelland, Maier & Neustadt, L.L.P.

(57) ABSTRACT

A turbomachine including an accessory drive case, connected to the engine shaft via a radial shaft, wherein the accessory drive case also includes: a primary shaft which is driven by the radial shaft via a bevel gearbox, and assemblies for mechanically driving accessories, driven by the primary shaft and configured such that the related accessories lie at the upper portion and on at least one of the side edges of the engine case.

17 Claims, 5 Drawing Sheets

(51) Int. Cl.
*F16H 1/22* (2006.01)
*F01D 25/24* (2006.01)

(52) U.S. Cl.
CPC ....... *F16H 1/225* (2013.01); *F05D 2220/323* (2013.01); *F05D 2260/40311* (2013.01); *Y02T 50/671* (2013.01)

(58) Field of Classification Search
CPC ..... F16H 2057/02026; F05D 2220/323; F05D 2260/40311
USPC .......................... 74/89.16, 98, 379, 425, 745
See application file for complete search history.

(56) References Cited

U.S. PATENT DOCUMENTS

| 4,380,897 | A | * | 4/1983 | Zaba | F01D 15/12 |
| | | | | | 60/39.465 |
| 5,687,561 | A | | 11/1997 | Newton | |
| 2007/0049454 | A1 | * | 3/2007 | Mitrovic | B64D 35/00 |
| | | | | | 475/331 |
| 2007/0137352 | A1 | * | 6/2007 | Hrushka | F16H 1/16 |
| | | | | | 74/425 |
| 2012/0117981 | A1 | | 5/2012 | Suciu et al. | |
| 2016/0040601 | A1 | * | 2/2016 | Frost | F02C 7/32 |
| | | | | | 415/122.1 |

FOREIGN PATENT DOCUMENTS

| EP | 2 455 597 A2 | 5/2012 |
| FR | 2 290 576 | 6/1976 |
| GB | 2 169 968 A1 | 7/1986 |

OTHER PUBLICATIONS

Preliminary Search Report completed Sep. 23, 2013 in French Patent Application No. FR 1355240 (with English translation of Categories of Documents).

Notification of Transmission of International Search Report dated Nov. 17, 2014 in PCT/FR2014/051321 (with English translation of Categories of Documents).

* cited by examiner

ACCESSORY DRIVE CASE FOR A TURBOPROP

FIELD OF THE INVENTION

The present invention relates to the field of turbomachinery, and more particularly to turboprops, and particularly low power turboprops comprising a non-coaxial gearbox for the propeller. It relates in particular to the assembly of auxiliary equipment and mechanical transmission between an engine shaft in a turboprop, and this equipment using an accessory gearbox, or AGB.

TECHNOLOGICAL BACKGROUND

The accessory gearbox, well-known to a person skilled in the art under the term AGB, supports different auxiliary equipment or accessories, mounted on the engine and required for its operation or that of the aircraft. These various accessories can in particular comprise a generator, a starter, fuel or oil hydraulic pumps, and are driven mechanically by the engine shaft through intermediate drive shafts. The necessary power for driving the accessories is generally drawn mechanically from the compressor of the turbomachine.

Usually, the AGB comprises parallel-axis gearing to mechanically drive the accessories. The separation of the accessories is therefore determined by the center distance between the gearing, and not by their respective bulk. To increase this separation, one or more intermediate gears are therefore necessary, which has the disadvantage of increasing both the bulk of the AGB and its mass. Moreover, the axes of all the gearing of the AGB being parallel, the accessories have necessarily the same orientation with respect to the AGB and the engine.

Moreover, in the case of a turbofan, the gas generator is connected to a fan which is housed in a fan casing. The nacelle then has a generally circular cross-section. The space available for housing the AGB is consequently defined as an annular portion housed in the nacelle, surrounding the turbomachine, and consequently having generally curved shape (see FIG. 1).

In comparison, in the case of a turboprop, the gas generator causes a propeller to rotate through a propeller gearbox. The propeller is not housed in a casing, and the nacelle has a generally rectangular cross-section. The space available to house the AGB is therefore different from that of turboprops, and extends principally above and below the turbine engine, with a slight space on the lateral flanks.

The conventional AGBs of turbojets are therefore not adapted from a structural, dimensional and functional point of view to turboprops, particularly those with low power comprising a non-coaxial gearbox for a propeller. Moreover, the Applicant realized that conventional AGBs do not allow accessories to be spread over a relatively large angular sector of the periphery of a turboprop nacelle, and in particular do not allow installing accessories both on top of the casing of the turboprop and along at least one of its flanks.

For example, document U.S. Pat. No. 5,687,561 describes an engine of a turbojet comprising a gearbox for the accessories of an engine comprising an engine shaft, intended to mechanically drive at least two accessories, each having a transmission shaft. The configuration and the means for driving the accessories are not specified, however.

Document EP 2 455 597, for its part, describes an engine comprising a gearbox for accessories with parallel-axis gearing, comprising an engine shaft intended to mechanically drive at least two accessories each comprising a transmission shaft.

Finally, document U.S. Pat. No. 1,832,111 describes a gearbox comprising a primary drive shaft and angle gears. This gearbox is however not suited for use in a turboprop.

SUMMARY OF THE INVENTION

One objective of the invention is therefore to propose a gearbox for driving accessories which can be used in a turboprop, which is also scalable and makes it possible to make the installation of the various accessories more flexible by being independent of their bulk without, however, changing their drive speed, which further has moderate weight and which makes it possible to distribute the accessories over a greater periphery of the turboprop while taking into account the particular shape of the turboprop nacelle.

To this end, the invention proposes a turboprop comprising:
- an engine casing,
- an engine shaft, housed in the engine casing, said engine shaft defining an axis of rotation,
- an accessory gearbox, positioned outside the engine casing, the accessory gearbox being connected to the engine shaft through a radial transmission shaft driven by the engine shaft forming an angle with the axis of rotation of the engine shaft, and
- a plurality of transmission shafts intended to mechanically drive the accessories, the turboprop being characterized in that the accessory gearbox further comprises:
- a primary shaft, extending substantially transversely to the axis of rotation of the engine shaft and driven by the radial transmission shaft through a primary angle gear, said primary angle gear comprising a primary gear member mounted in the primary shaft, and
- a plurality of mechanical drive assemblies for the transmission shafts, said drive assemblies being driven by the primary shaft and being configured so that the associated accessories (3) extend partly above and on at least one of the lateral edges of the engine casing.

Certain preferred but not limiting features of the turboprop described above are the following:
- at least one of the drive assemblies comprises a secondary gearing member fixedly attached to the primary shaft and an output gearing member fixedly attached to the transmission shaft of the accessory driven by the drive assembly.
- the secondary gearing member comprises a bevel wheel and the output gearing member comprises a bevel gear so that an axis of the primary shaft and an axis of the transmission shaft are concurrent,
- the primary angle gear comprises an input gearing member fixedly attached to the radial transmission shaft,
- the gearing members of the primary angle gear have concurrent axes, the input gearing member comprising an input bevel gear, and the primary gearing member comprising a bevel crown gear,
- the gearing members of the primary angle gear and/or of at least one of the drive assemblies have non-concurrent axes,
- the primary angle gear comprises a wheel and a worm,
- at least one of the drive assemblies comprises a angle gear comprising two gearing members each comprising a wheel and a worm, the accessory gearbox comprises a box casing and the gearing members of the at least one drive assembly are attached to the box casing by at least two connecting members extending on either side of each gearing member, at least one of the drive assemblies comprises parallel-axis gearing comprising a secondary wheel driven by the primary shaft and an output wheel fixedly attached to the transmission shaft, so that the axis of the secondary wheel and the axis of the output wheel are parallel, at least two of the drive assemblies are driven in series by the same gearing member attached to the primary shaft, said gearing member comprising a secondary wheel attached to the primary shaft, and at least one of the drive assemblies comprises an output wheel driven through an intermediate wheel by a secondary wheel attached to the primary shaft.

According to a second aspect, the invention also proposes an aircraft, comprising a nacelle and a turboprop as described above, housed in the nacelle, wherein the nacelle is of a shape generally elongated in a vertical direction and the turboprop is arranged in an area generally below the nacelle while the accessory gearbox extends within a generally upper area of said nacelle.

Certain preferred but not limiting aspects of the aircraft described above are the following:

the accessory gearbox comprises a plurality of accessories distributed in the upper area of the nacelle and on at least one of the lateral edges of the engine casing, and the accessory gearbox comprises a first accessory positioned at a first free end of the primary shaft and arranged so as to extend downward by being positioned along a first lateral edge of the engine casing.

BRIEF DESCRIPTION OF THE DRAWINGS

Other features, aims and advantages of the present invention will appear more clearly upon reading the detailed description that follows, and referring to the appended drawings given by way of non-limiting examples and wherein.

DETAILED DESCRIPTION OF ONE EMBODIMENT

The invention will be described very particularly with reference to a turboprop 8 connected to a propeller, and an accessory gearbox 1 intended to mechanically drive four pieces of auxiliary equipment or accessories 3, necessary for the operation of the engine 8 or for that of the aircraft. This is however not restrictive, in that the accessory gearbox 1 could be used in any other turbomachine needing to support and drive accessories, and that the number of accessories described hereafter can be different depending on the needs of the turbomachine.

A turboprop 8 typically comprises a nacelle which forms an opening for admission of a determined air flow toward the engine 8 itself. Generally, the turboprop 8 comprises one or more sections for compressing the air admitted into the engine 8. The air thus compressed is admitted into a combustion chamber and mixed with fuel before being burned there. The hot exhaust gases resulting from this combustion are then expanded in several turbine stages. The turbine then drives a propeller gearbox which provides rotational energy to the propeller.

Figure 3:
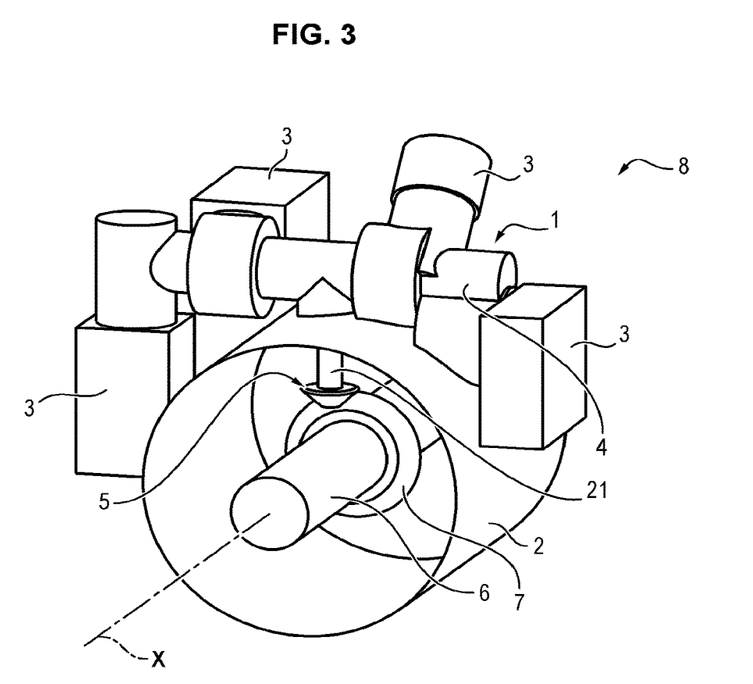
FIG. 3 is a three-dimensional scheme illustrating the inner elements of the accessory gearbox of FIG. 2 housed in a gearbox casing and connected on the one hand to examples of accessories and on the other hand to a turbomachine casing.

The accessory gearbox 1, or AGB 1, for its part can be attached to a casing 2 of the engine, for example at the compressor, and mechanically drives at least two accessories 3, for example four accessories 3 as shown in FIG. 3 or a still greater number, by drawing the necessary drive power from an engine shaft 6, generally the compressor shaft.

To this end, the engine shaft 6 is housed in the engine casing 2 and defines an axis of rotation X. Moreover, the accessories 3 each comprise a transmission shaft 35a-35c intended to mechanically drive the corresponding accessory 3.

The AGB for its part is positioned outside the engine casing 2 and is connected to the engine shaft 6 through a radial transmission shaft 21, driven by the engine shaft 6. Here, the radial transmission shaft 21 forms an angle with the rotation axis X of the engine shaft 6.

The AGB further comprises a primary shaft 10 and a plurality of mechanical drive assemblies 30a-30c for the transmission shafts 35a-35c.

The primary shaft 10 extends substantially transversely to the axis of rotation X of the engine shaft 6 and is driven by the radial transmission shaft 21 through a primary angle gear 20.

The mechanical drive assemblies 30a-30c for the transmission shafts 35a-35c, for their part, are driven directly or indirectly by the primary shaft 10 and are configured so that the associated accessories 3 preferably extend in the upper portion and on at least one flank of the engine casing 2.

Figure 1:
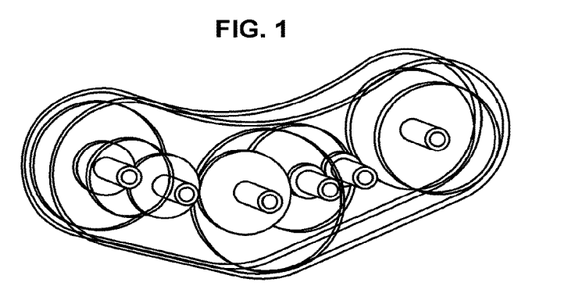
FIG. 1 illustrates an example of a conventional accessory gearbox which can be used in a turbojet.

Thanks to this configuration, and particularly to the transverse direction of the primary shaft 10, the AGB makes it possible to distribute the accessories over a wider angular sector of the periphery of the turboprop 8, taking into account its dimensions and its geometry, in comparison with a conventional AGB such as that shown in FIG. 1. In particular, it is currently possible to distribute accessories 3 in the upper portion and over at least one of the flanks of the casing 2 of the turboprop 8. Moreover, the use of an angle gear and of a primary shaft 10 makes it possible to adapt the speed of rotation of the transmission shafts 35a-35c, through their mechanical drive assemblies 30a-30c.

Here, the upper portion of the casing 2 of the engine will be understood to mean the portion of the casing 2 connected to the AGB 1, and by lateral flanks the sides of the casing 2 extending on either side of the upper portion of the casing 2.

The primary angle gear 20 comprises an input gearing member 22, 26 driven by the engine shaft 6, and a primary gearing member 24, 28 attached to the primary shaft 10.

The primary angle gear 20 extends, preferably centrally with respect to the primary shaft 10, so that the primary shaft 10 is generally centered on the casing 2. The angle formed between the axes of the gearing members 22, 24 of the primary angle gear 20 (in the plane comprising the rotation axis X of the engine 8 and the center of the primary angle gear 20) is then preferably 90°.

The gearing members 22, 24, 26, 28 of the primary angle gear 20 are moreover selected so that their respective axes are not parallel. The axes of the gearing members can thus be concurrent 23, 25 or not concurrent 27, 29.

The input gearing member 22, 26 is fixedly attached to a radial transmission shaft 21 which is driven by a gear 5 driven by the engine shaft 6 using a crown gear 7. Thus, the rotation of the engine shaft 6 drives the rotation of the input gearing member 22, 26 of the primary angle gear 20. Here, the radial transmission shaft 21 extends in a radial direction with respect to the axis of rotation X of the engine. As a variation, it could also form an angle other than 90° with the axis of rotation X of the engine.

Figure 2:
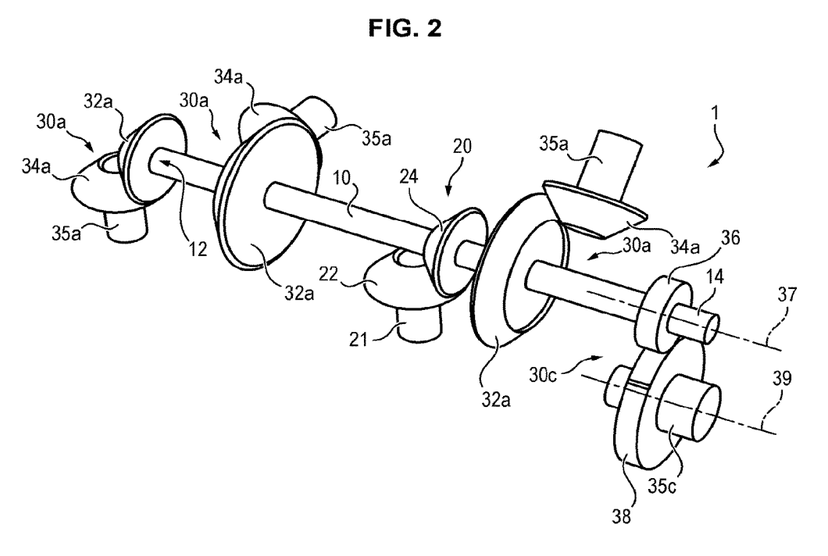
FIG. 2 is a three-dimensional view of a first embodiment of an accessory gearbox conforming to the invention, wherein the casing has been omitted, and capable of being used in a turbomachine of the turboprop type.

For example, the input gearing member can comprise an input bevel gear 22, that is a wheel of which the toothed surface is defined by a generator passing through a fixed point (see FIG. 2).

The primary gearing member, for its part, can then comprise a bevel crown gear 24. Here again, the bevel crown gear 24 comprises a wheel of which the toothed surface is defined by a generator passing through a fixed point.

In the primary angle gear 20, the bevel surface of the input gear 22 is in contact with the bevel surface of the crown gear 24. Moreover, the teeth of the input gear 22 and of the crown gear 24 are of the same type (straight teeth, helical teeth, herringbone, etc.) and of the same module (that is the ratio of diameter to the number of teeth), and the centers of the generator of their respective toothed surfaces meet at a single point, so that the input gear 22 is able to drive the crown gear 24 in rotation.

The number of teeth and the radius of the input gear 22 and of the crown gear 24 are selected depending on the desired gear ratio for the primary angle gear 20. This gear ratio corresponds to the ratio between the rotation speed of the radial transmission shaft 21 and the rotation speed of the primary shaft 10 (which is equal to the ratio between the radius of the bevel crown gear 24 to the radius of the input gear 22).

The gear ratio of the primary angle gear 20 is preferably comprised between 0.5 and 2, and can be near or equal to 1.

Figure 4:
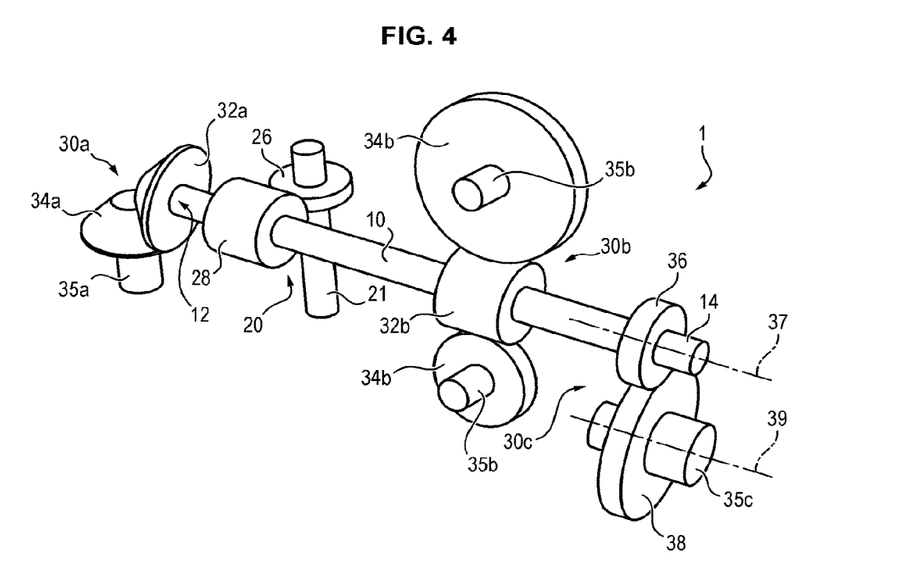
FIG. 4 is a three-dimensional view of a second embodiment of an accessory gearbox conforming to the invention, on which the casing has been omitted, and capable of being used in a turbomachine of the turboprop type.

According to a variant embodiment, the primary angle gear 20 can comprise gearing members 26, 28 having non-concurrent axes 27, 29 (see FIG. 4).

Thus, the input gearing member can comprise an input wheel 26, that is a wheel the toothed surface whereof is of a generally rotating cylindrical shape. The input wheel 26 is therefore fixedly attached to the radial transmission shaft 21, so that the rotation of the engine shaft 6 drives the rotation of the input wheel 26.

The primary gearing member, for its part, can comprise a primary worm 28 fixedly attached to the primary shaft 10. Here again, its toothed surface is of a generally rotating cylindrical shape.

As a variant (not illustrated in the figures), the input gearing member can comprise a worm fixedly attached to the radial transmission shaft 21, while the primary angle gear comprises a wheel fixedly attached to the primary shaft 10.

This embodiment makes it possible to limit the loads at the gearing members 26, 28. In fact the connecting members between the shafts 10, 21 and the casing 4 of the AGB 1 comprise ball or roller bearings which can be positioned on either side of the gearing members 26, 28 on the corresponding shaft, provided that the axes of the gearing members are non-concurrent and can pass through said means. It is thus possible to reduce the bending moments of the input wheel 26 on the worm 28, and therefore to improve reliability, mass and bulk.

Figure 7:
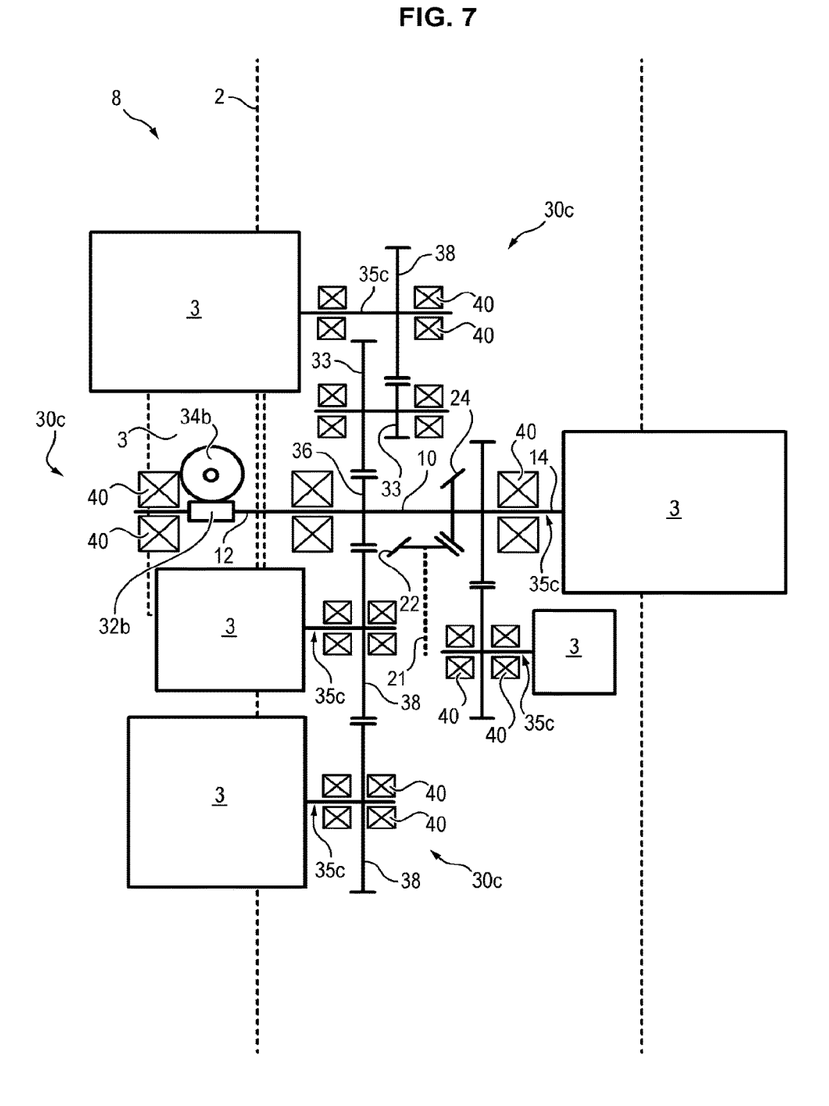
FIG. 7 is a top schematic view of a third embodiment of an accessory gearbox conforming to the invention capable of being used in a turbomachine of the turboprop type.

The AGB 1 further comprises as many drive assemblies 30a-30c as accessories 3 to be driven. As a variant, depending on the embodiment of the drive assembly, one and the same drive assembly can be used to drive, on either side of the primary shaft 10 (see FIG. 4) or in series (see FIG. 7) different accessories depending of speeds of rotation in opposite directions. As we will see later, this last embodiment is particularly feasible when the drive assembly comprises gearing with parallel axes (FIG. 7). Indeed it becomes possible to drive, using one and the same drive assembly, two accessories 3 connected in series on one gearing with parallel axes, thus making it possible to better distribute the accessories 3 in the upper portion of the casing 2, for example along the axis X of the engine 8.

A drive assembly can comprise a secondary angle gear 30a-30b comprising gearing with concurrent axes or even gearing with non-concurrent axes, or gearing with parallel axes 30c.

For example, the drive assembly can comprise a secondary angle gear 30a, comprising a secondary gearing member 32a driven by the primary shaft 10, and an output gearing member 34a fixedly attached to the transmission shaft 35a of the accessory 3.

The secondary gearing member can in particular comprise a bevel wheel 32a, while the output gearing member comprises a bevel gear 34a, so that the axis of the primary shaft 10 and the axis of the transmission shaft 35a are concurrent. An example of such a drive assembly 30a can be seen in FIG. 2, for three of the accessories 3.

What is meant by a bevel wheel 32a and bevel gear 34a is a wheel of which the toothed surface is defined by a generator passing through a fixed point.

Figure 6A:
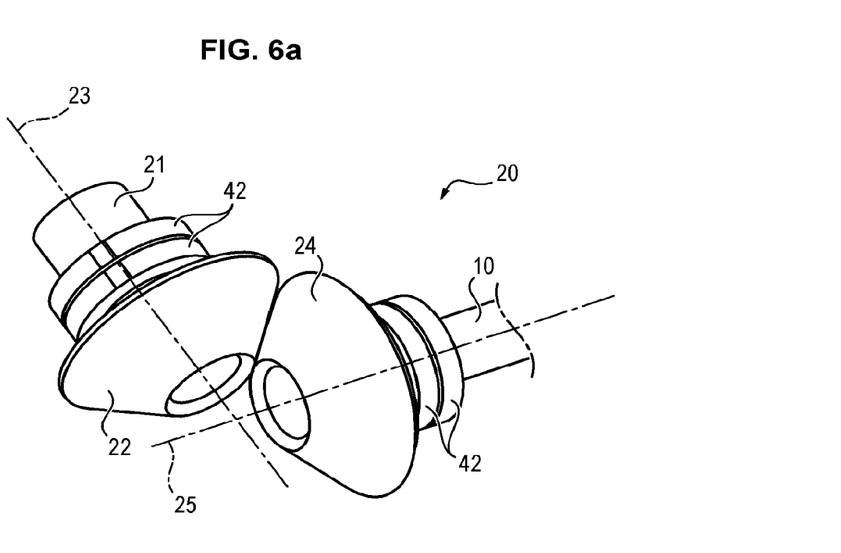
FIGS. 6a and 6b illustrate embodiments of angle gears.

Similarly to the primary angle gear 20, illustrated in FIG. 6a, the bevel surface of the wheel 32a of the secondary angle gear is in contact with the bevel surface of the corresponding gear 34a, and their teeth are of the same type and the same module, and the centers of the generator of their respective toothed surfaces coincide at one point so that the wheel 32a is able to drive the gear 34a.

The number of teeth and the radius of the wheel 32a and of the gear 34a are also selected according to the desired gear ratio for the secondary angle gear 30a, which corresponds to the ratio between the radius of the wheel 32a and the radius of the gear 34a and is preferably comprised between 0.5 and 2, and can be near or equal to 1.

Moreover, the bevel wheel 32a can be connected to a second bevel gear (not illustrated in the figures) extending from the other side of the primary shaft 10 with respect to the other bevel gear 34a. The two bevel gears can have different radii (but of the same type and with the same module, the centers of the generators of their respective toothed surface coinciding at one point), depending on the desired gear ratio for their respective accessory 3.

As a variant, one or the secondary angle gear(s) 30b can comprise a secondary angle gear with non-concurrent axes. In this case, the secondary gearing member can in particular comprise a wheel while the output gearing member can comprise a worm, or the reverse, so that the primary shaft 10 and the transmission shaft 35b have non-concurrent axes.

Figure 6B:
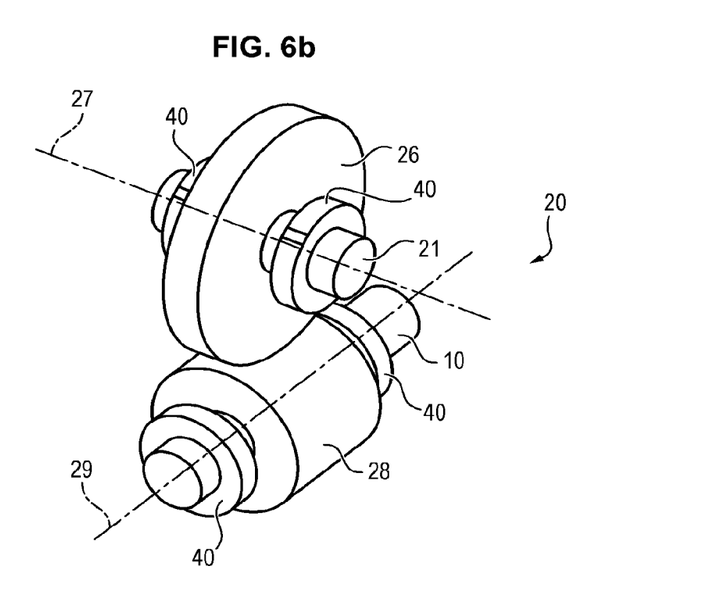

Here again, and in a similar manner to the primary angle gear illustrated in FIG. 6b, the worm can be connected to a second bevel wheel, extending on the other side of the primary shaft 10 with respect to the other wheel (or the reverse). The two wheels can have different radii (but of the same type and with the same module, the centers of their respective toothed surfaces coinciding at one point), depending on the desired gear ratio for their respective accessory.

According to yet another variant, the drive assembly comprises gearing with parallel axes 30c.

Thus, the secondary gearing member 30c can in particular comprise a secondary wheel 36 fixedly attached to the primary shaft 10, while the output gearing member comprises an output wheel 38 fixedly attached to the transmission shaft 35c of the accessory 3, so that the axes 37, 39 of the secondary 36 and output 38 wheels are parallel.

An example of such a drive assembly 30c is visible in FIG. 2, for the accessory 3. So as to limit the bulk of the AGB 1, the parallel-axis gearing 30c can be positioned in an area adjoining a free end 12 of the primary shaft 10. In this manner, the accessory 3 driven by this drive assembly 30c can extend laterally with respect to the casing 2 of the engine. For example, in the embodiment of FIGS. 2 and 3, the secondary wheel 36 is positioned near the free end 12 of the primary shaft 10, at a lateral flank of the casing 2 of the engine, while the output wheel 38 extends below said secondary wheel 36, facing the lateral flank of the casing 2 of the engine.

This embodiment of the drive assembly thus makes it possible, with very little clutter, to achieve considerable gear ratios, and offers the possibility of placing accessories 3 on at least one of the flanks of the casing 2 of the engine.

The surfaces of the teeth of the wheels 36, 38 are in contact and their teeth are of the same type and have the same module, and the centers of the generators of their respective toothed surfaces coincide at one point, so that the secondary wheel 36 can drive the output wheel 38. Moreover, the number of teeth and the radii of the teeth 36, 38 are selected depending on the gear ratio desired, which corresponds to the ratio between the radius of the secondary wheel 36 to the radius of the output wheel 38 for the parallel axis gearing 30c, and is preferably comprised between 1 and 5, each of the accessories having a different drive speed. It will be noted that the drive assemblies with parallel axes 30c make it possible to obtain large gear ratios, which can be useful for certain accessories such as for lubrication units for example, for which the speed of rotation of the corresponding shaft is much smaller than the speed of rotation of the engine shaft 6.

Again, the secondary wheel 36 can be connected to a second output wheel (not illustrated in the figures), extending from the other side of the primary shaft 10 with respect to the other output wheel 38, which can have a different radius (but of the same type and with the same module, the centers of the generators of their respective toothed surfaces coinciding at one point), depending on the desired gear ratio.

The primary shaft 10, the primary angle gear 20 and the drive assemblies 30a-30c can be manufactured separately. The input bevel gear 22, 26, the bevel wheels 32a and the secondary wheel 36 are then applied to the primary shaft 10 and set in position with respect to said shaft 10. Moreover, the connecting member between the casing 4 of the AGB and the primary shaft 10 is accomplished using ball or roller bearings, so as to limit the friction caused by this connecting member.

Thus, thanks to its primary shaft 10, its primary angle gear 20 and its drive assemblies 30a-30c, the AGB 1 makes it possible to drive a series of accessories 3 independently at suitable speeds by simply adjusting the center distance between the drive assemblies 30a-30c and their respective gear ratio. The AGB also allows the distribution of accessories 3 over a larger portion of the periphery of the casing 2 and particularly over its upper portion and on at least one flank of the casing 2.

Thus, we have illustrated in FIGS. 2 and 3 an example of an AGB 1 supporting four accessories 3.

Here, the primary shaft 10 extends transversely to the rotation axis X of the engine 8. Moreover, the primary angle gear 20 comprises an input bevel gear 22 and a bevel crown gear 24.

The first accessory 3 is positioned at a first free end 12 of the primary shaft 10, and is driven through a first drive assembly 30a comprising a first angle gear formed by a bevel wheel 32a and a bevel gear 34a.

The second accessory 3 is positioned between the first accessory 3 and the primary angle gear 20, and is driven through a second drive assembly 30a comprising a second angle gear formed from a bevel wheel 32a and a bevel gear 34a.

In order that the first accessory 3, the second accessory 3, the primary angle gear 20 and the casing 2 of the engine not interfere with one another, despite their respective bulk, the first angle gear 30a can be arranged so as to extend downward, so that the first accessory 3 is positioned along a lateral flank of the casing 2 of the engine, and the second angle gear 30a can be arranged so as to extend generally parallel to the axis of rotation X of the engine 8, so that the second accessory 3 is positioned along the casing 2 of the engine 8, in its upper portion.

The third accessory 3 for its part is positioned between the primary angle gear 20 and the second free end 14 of the primary shaft 10, and is driven through a third drive assembly 30a comprising a third angle gear formed by a bevel wheel 32a and a bevel gear 34a.

The fourth accessory 3 is positioned at the second other free end 14 of the primary shaft 10 and is driven through a fourth drive assembly 30c comprising parallel axis gearing formed of two wheels 36, 38.

In order that the third accessory 3, the fourth accessory 3, the primary angle gear 20 and the casing 2 of the engine not interfere with one another, despite their respective bulk, the third angle gear 30a can be arranged so as to extend upward (in the opposite direction from the engine 8), so that the third accessory 3 is remote from the casing 2 of the engine, and the parallel-axis gearing 30c can be arranged in the direction of the lower portion of the casing 2, so that the fourth accessory 3 is positioned along the other lateral flank of the casing 2 of the engine.

The respective gear ratios of the four drive assemblies 30a-30c and of the primary angle gear 20 are further selected depending on the desired rotation speed for the corresponding accessories 3. Thus, in the example of FIGS. 2 and 3, the gearing members of the primary angle gear 22, 24 and of the first driving assembly 32a, 34a have generally similar diameters: the gear ratio of these angle gears 20, 30a is therefore substantially equal to 1. On the other hand, the secondary gearing members 32a of the second and the third drive assembly 30a have greater diameters than their respective output gearing members 34a, so that their gear ratio is greater than 1 (increasing). Finally, the radius of the secondary gearing member 36 is smaller than the radius of the output gearing member 38, so that the gear ratio of the fourth drive assembly 30c is less than 1 (reducing).

Figure 5:
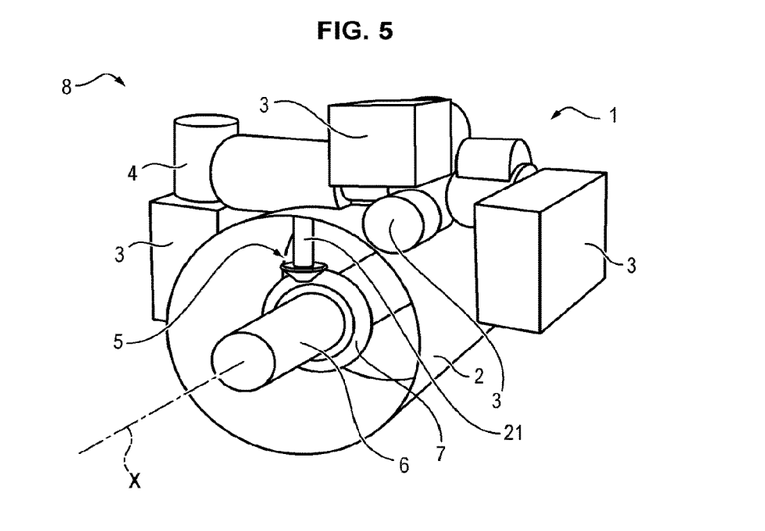
FIG. 5 is a three-dimensional schematic illustrating the inner elements of the accessory gearbox of FIG. 2 housed in a gearbox casing and connected on the one hand to examples of accessories and on the other hand to a turbomachine casing.

Illustrated in FIGS. 4 and 5 is a second example of an AGB 1 conforming to the invention supporting four accessories 3.

In FIG. 4, the primary shaft 10 extends transversely to the axis of rotation X of the engine 8. Moreover, the primary angle gear 20 further comprises here an input wheel 26 and a primary worm 28.

A first accessory 3 is positioned at the first free end 12 of the primary shaft 10, and is driven through a first drive assembly 30a comprising an angle gear with concurrent axes formed from a bevel wheel 32a and a bevel gear 34a.

Similarly to the first example of an AGB 1 illustrated in FIGS. 2 and 3, the angular drive 30a can be arranged so as to extend downward, so that the first accessory 3 is positioned along a lateral flank of the casing 2 of the engine and does not interfere with the primary angle gear 20 nor the casing 2 of the engine.

The second accessory 3b is positioned between the primary angle gear 20 and the second free end 14 of the primary shaft 10, and is driven through a second drive assembly 30b comprising an angle gear with non-concurrent axes formed by a worm 32b and a wheel 34b.

The third accessory 3, for its part, is positioned facing the second accessory 3, and is driven through a third drive assembly 30b comprising a third angle gear with non-concurrent axes formed from the worm 32b of the second accessory 3 and an additional wheel 34b.

Thus, the same worm 32b is part of both of the two drive assemblies 30b, so as to drive two different output wheels 34b and therefore two different accessories 3.

The fourth accessory 3, for its part, is positioned at the other free end 12 of the primary shaft 10 and is identical to the fourth accessory of FIG. 2. To this end, the fourth accessory 3 is driven through a drive assembly 30c comprising gearing with parallel axes formed of two wheels 36, 38. To avoid it interferes with the second and third accessories 3 nor the casing 2 of the engine, the fourth accessory 3 can be arranged in the direction of the lower portion of the casing 2, along the flank of the casing 2.

Thus, in this second example of an AGB 1, the primary angle gear 10 and the drive assemblies 30a-30b comprise an angle gear with non-concurrent axes while the third drive assembly 30c comprises gearing with parallel axes.

Furthermore illustrated in FIG. 7 is a third embodiment of a propulsor comprising an AGB 1 conforming to the invention. In this embodiment, the AGB 1 comprises six accessories 3.

Here again, the primary shaft 10 extends transversely to the rotation axis X of the engine 8. Moreover, the primary angle gear 20 comprises an input bevel gear 22 and a bevel crown gear 24. This is not limiting, in that the primary angle gear 20 could further comprise an angle gear with non-concurrent axes, comprising for example a worm and a corresponding wheel.

The first accessory 3 is positioned at the second free end 14 of the primary shaft 10, and is driven directly by the primary shaft 10. The speed of rotation of the drive shaft 30a of the first accessory 3 is therefore set by the gear ratio of the primary angle gear 20 and the speed of rotation of the radial shaft 21.

The second accessory 3 is positioned between the first accessory 3 and the primary angle gear 20 and is driven through a drive assembly 30c with parallel axes formed from a secondary wheel 36, fixedly attached to the primary shaft 10 between the bevel crown gear 24 and the first accessory 3, and an output wheel 38 fixedly attached to the transmission shaft 35c of the second accessory 3, so that the axes 37, 39 of the secondary 36 and output 38 wheels are parallel.

The use of gearing with parallel axes 30c makes it possible to place the second accessory 3 upstream or downstream on the casing 2 with respect to the first accessory 3, by offsetting the second accessory 3 along the axis X of the engine 8. The first accessory 3 and the second accessory 3 therefore both extend in the upper portion of the casing 2.

The third, fourth and fifth accessories 3 are arranged for their part between the primary angle gear 20 and the first free end 12 of the primary shaft 10, and are driven through one and the same third drive assembly 30c with parallel axes comprising a secondary wheel 36, fixedly attached to the primary shaft 10.

Thus the third accessory 3 is driven through a first output wheel 38, which is in contact with the secondary wheel 36.

The fourth accessory 3 is driven by a secondary output wheel 38, which is driven by the secondary wheel 36 through the first output wheel 38 of the third accessory 3. The fourth accessory 3 is therefore connected in series with the output wheel 38 of the third accessory 3 and with the secondary wheel 36.

The fifth accessory 3 is driven by a third output wheel 38, which is driven by the secondary wheel 36 through two intermediate wheels 33. The fifth accessory 3 is therefore connected in series with the intermediate wheels 33 and with the secondary wheel 36. The implementation of these two intermediate wheels 33 makes it possible in fact to adjust the gear ratio between the third secondary wheel 36, which is driven directly by the primary shaft 10 and the output wheel 38 which drives the transmission shaft 35c of the fifth accessory 3 to obtain a considerably reduction ratio in the gearing while still optimizing the position of the fifth accessory 3 with respect to the casing 2.

The third and fourth accessories 3 which extend in series, can thus be positioned in the upper portion of the casing 2 on the same side, upstream or downstream, of the casing 2 with respect to the transverse primary shaft 10, while the fifth accessory 3 can be placed remotely from the primary shaft 10 thanks to different wheels 36, 33, 38 in series, also in the upper portion of the casing 2, opposite to the third and fourth accessories with respect to the primary shaft 10.

Finally, the sixth accessory 3 is positioned at the first free end 12 of the primary shaft 10 and is driven through a driving assembly 30b comprising an angle gear with non-concurrent axes consisting of a worm 32b, fixedly attached to the primary shaft 10, and an output wheel 34b fixedly attached to the transmission shaft of the accessory 3. This arrangement thus makes it possible to place the sixth accessory 3 along the flank of the casing 2. If the transmission shaft of this sixth accessory 3 is positioned so as to extend substantially vertically, that is generally in the direction of the radial shaft 21, the accessory 3 can be positioned relatively low with respect to the casing 2. Such an arrangement could be advantageous, in particular when the accessory 3 consists of a lubrication unit. As a variant, it is possible to replace the angle gear with non-concurrent axes 30b, formed by the worm 32b and the output wheel 34b, by an angle gear with concurrent axes 30a, for example using bevel gears. Better efficiency in transmitting power can in fact be sought even if this is accomplished to the detriment of the compactness of the gearing, compared with a worm which allows a certain compactness but generally does not offer very good efficiency.

The respective gear ratios of the six drive assemblies 30b, 30c and of the primary angle gear 20 are further selected according to the desired rotation speed for the corresponding accessories 3.

Thus, in the example of FIGS. 2 and 3, the gearing members of the primary angle gear 22, 24 and of the first drive assembly 32a, 34a have generally similar diameters: the gear ratio of these angle gears 20, 30a is therefore substantially equal to 1. On the other hand, the secondary gearing members 32a of the second and third drive assemblies 30b have greater diameters than their respective output gearing members 34b, so that their gear ratio is greater than 1 (increasing). Finally, the radius of the secondary gearing member 36 is smaller than the radius of the output gearing member 38, so that the gear ratio of the fourth drive assembly 30c is less than 1 (reducing).

By comparison, in the example of FIG. 7, the gearing members 36, 38 of the drive assembly of the third and fourth accessory 3 have similar diameters and are driven by one and the same secondary wheel 36, while the gearing members 36, 38 of the drive assembly 36, 38 of the second 3, fifth 3 and sixth 3 accessories have a different diameter and therefore different gear ratios.

It will be noted that the implementation of the gearing members with non-concurrent axes 32, 34, 36, 38 (whether these are the primary angle gear 20 or secondary angle gears 30b-30c) makes it possible for the associated shafts (radial transmission shaft 21, primary shaft 10 and transmission shafts 35b-35c) to pass through the gearing members forming said angle gears from side to side. It is therefore possible not to attach the gearing members to the free end of the shafts 35b, 35c.

Thus, the attachment of gearing members with non-concurrent axes to the casing 4 of the AGB 1 can be accomplished in two non-adjoining points, on either side of each gearing member rather than in a single point at the end of shaft 35b, 35c. By imposing two support points on either side of the gearing members 32, 34, 36, 38, it is thus possible to reduce the bending moments at the associated gearing members 32, 34, 36, 38, and therefore to improve reliability, bulk and mass for the AGB 1 (see in particular FIG. 6b or FIG. 7 for example).

The gearing members 32, 34, 36, 38 of the AGB can at present be attached to the casing 4 of the AGB 1 at each shaft 35, 35c in two non-adjoining points using suitable connecting members, for example roller or ball bearings 40. It will be noted that the implementation of ball or roller bearings 40 also makes it possible to limit friction between the casing 4 of the AGB 1 and the shafts of the angle gears with non-concurrent axes.

The bearings 40 then comprises an inner ring, attached to the shaft, and an outer ring attached to the casing 4 of the AGB 1, the inner ring and the outer ring being movable in rotation with respect to one another about the shaft 35, 35c thanks to balls or rollers 40 (depending on the type of bearing) extending between the two.

For example, in the case of the input wheel 22 and of the primary worm 24 illustrated in FIG. 6b, their non-concurrent axes 23, 24 allow the implementation of two pairs of connecting members 40 of the ball or roller bearing type. Each connecting member 40 comprises two bearings, extending on either side of one of the gearing members 22 (resp. 24). In this manner, the radial transmission shaft 21 (resp. the primary shaft 10) can be attached to the casing of the AGB 1 at two non-coincident points (and separated by at least the length of the wheel 22), said points of attachment corresponding to the two bearings 40 extending on either side of the input wheel 22 (respectively the primary worm 24). The same is true even in the case of gearing members with parallel axes (see particularly in FIG. 7).

By way of comparison, in the case of a primary angle gear with concurrent axes, such as a bevel coupling (see FIG. 6a), the primary shaft 10 cannot be extended beyond the bevel gear so that the two bearings 42 should be positioned on the same side (FIG. 6a). There would therefore only be a single connection (and thus a single support point) between the shafts and the casing 4 of the AGB 1, which would consequently require loading the connections twice as strongly as in the case of connections distributed on each side of the gearing members. Furthermore, the connection of the shafts to the casing 4 at the connecting members creates a lever arm at the connection, and therefore a considerable bending moment which rapidly wears the parts of the angle gear.

It will be noted that the increase or reduction of the gear ratios can be carried out independently of the bulk of the accessory 3 driven by the drive assemblies 30a-30c, whether by connecting their respective gearing members directly to the primary shaft 10 or through an intermediate gearing member 33, particularly in the case of angle gears with non-concurrent and parallel axes 36, 38. Indeed it is sufficient to change the dimension (radius and/or dimension of the teeth) of the associated gearing members. The installation of the AGB 1 equipment is therefore made considerably more flexible. It is also possible to use one and the same gearing to drive several accessories, particularly in the case of parallel axis gearing 36, 38.

Thus, the center distance between each drive assembly 30a-30c and the primary angle gear 20 can be selected independently of the radius and the number of teeth of the different gearing members, by connecting them directly or indirectly (via intermediate wheels 33 in particular) to the primary shaft 10. Moreover the use of bevel angle gears or with non-concurrent axes (worm and wheel) 32a, 32b, 34a, 34b, or gearing members with parallel axes 36, 38 makes it possible to adapt the angular position of the accessories 3 about the primary shaft 10 of the AGB 1 based on their bulk so as to optimize the possible installation volume of the accessory 3 in the AGB 1 in the upper portion of the casing 2 and/or on at least one flank of the casing 2.

The drive assemblies 30a-30c and the primary angle gear 20 can therefore be positioned on the primary shaft 10 depending on the size of the accessories 3, which makes it possible to better distribute the accessories 3 in the AGB 1, without changing the speed at which they are driven, in a space extending principally above the casing 2 of the engine and on at least one of its lateral flanks. The AGB 1 is therefore particularly suited to its use in a turboprop 8, whose nacelle has a generally elongated shape in the vertical direction and has a relatively large space in the upper portion of the casing 2.

Moreover, implementing the primary 20 and secondary 30a-30c angle gears can allow a reduction in the bulk of the AGB 1 and to better control the increase of its mass compared with conventional AGBs such as the one shown in FIG. 1, because it is no longer necessary to add intermediate wheels if it is desired to increase the center distance between two accessories or, in certain cases, if it is desired to add another accessory to the drive assemblies 30a-30c.

The invention claimed is:

1. A turbomachine, comprising:
an engine casing,
an engine shaft, housed in the engine casing, said engine shaft defining an axis of rotation,
an accessory gearbox, positioned outside the engine casing, the accessory gearbox being connected to the engine shaft through a radial transmission shaft driven by the engine shaft forming an angle with the axis of rotation of the engine shaft,
a plurality of transmission shafts intended to mechanically drive the accessories, a primary shaft, extending substantially transversely to the axis of rotation of the engine shaft and driven by the radial transmission shaft through a primary angle gear, said primary angle gear comprising a primary gearing member mounted on the primary shaft, and
a plurality of mechanical drive assemblies of the transmission shafts, said drive assemblies being driven directly by the primary shaft and being configured so that the associated accessories extend in an upper portion and over at least one lateral edge of the engine casing,
wherein the accessory gearbox comprises a first accessory positioned at a first free end of the primary shaft, wherein the first accessory is arranged so as to extend toward the engine and to be positioned along a first lateral edge of the engine casing.

2. The turbomachine according to claim 1, wherein at least one of the drive assemblies comprises a secondary gearing member fixedly attached to the primary shaft and an output gearing member fixedly attached to one transmission shaft of the plurality of transmission shafts of the accessory driven by the drive assembly.

3. The turbomachine according to claim 2, wherein the secondary gearing member comprises a bevel wheel and the output gearing member comprises a bevel gear so that an axis of the primary shaft and an axis of the one transmission shaft of the plurality of transmission shafts are concurrent.

4. The turbomachine according to claim 2, wherein at least one the gearing members of the primary angle gear and at least one of the drive assemblies have non-concurrent axes.

5. The turbomachine according to claim 4, wherein the primary angle gear comprises a wheel and a worm.

6. The turbomachine according to claim 4, wherein at least one of the drive assemblies comprises an angle gear comprising two gearing members comprising a worm and a wheel.

7. The turbomachine according to claim 4, wherein the accessory gearbox comprises a box casing and the gearing members of the at least one drive assembly are attached to the box casing by at least two connecting members extending on either side of each gearing member.

8. The turbomachine according to claim 1, wherein the primary angle gear comprises an input gearing member fixedly attached to the radial transmission shaft.

9. The turbomachine according to claim 8, wherein the gearing members of the primary angle gear have concurrent axes, the input gearing member comprising an input bevel gear and the primary gearing member comprising a bevel crown gear.

10. The turbomachine according to claim 1, wherein at least one of the drive assemblies comprises gearing with parallel axes comprising a secondary wheel driven by the primary shaft and an output wheel fixedly attached to one transmission shaft of the plurality of transmission shafts so that the axis of the secondary wheel and the axis of the output wheel are parallel.

11. The turbomachine according to claim 10, wherein at least two of the drive assemblies are driven in series by one and the same gearing member attached to the primary shaft said gearing member comprising a secondary wheel attached to the primary shaft.

12. The turbomachine according to claim 10, wherein at least one of the drive assemblies comprises an output wheel driven via an intermediate wheel by a secondary wheel attached to the primary shaft.

13. An aircraft, comprising:
a nacelle, and
a turbomachine according to claim 1 housed in the nacelle,
wherein the nacelle has a generally elongated shape in a vertical direction and the turbomachine is positioned in a generally lower area of the nacelle while the accessory gearbox extends within a generally upper area of said nacelle.

14. The aircraft comprising a turbomachine according to claim 13, wherein the accessory gearbox comprises a plurality of accessories distributed in the upper area of the nacelle and on the at least one lateral edge of the engine casing.

15. The turbomachine according to claim 1, comprising a turboprop.

16. A turbomachine, comprising:
an engine casing,
an engine shaft, housed in the engine casing, said engine shaft defining an axis of rotation,
an accessory gearbox, positioned outside the engine casing, the accessory gearbox being connected to the engine shaft through a radial transmission shaft driven by the engine shaft forming an angle with the axis of rotation of the engine shaft,
a plurality of transmission shafts intended to mechanically drive the accessories, a primary shaft, extending substantially transversely to the axis of rotation of the engine shaft and driven by the radial transmission shaft through a primary angle gear, said primary angle gear comprising a primary gearing member mounted on the primary shaft, and
a plurality of mechanical drive assemblies of the transmission shafts, said drive assemblies being driven directly by the primary shaft and being configured so that the associated accessories extend in the upper portion and over at least one lateral edge of the engine casing,
wherein at least one of the drive assemblies comprises a secondary gearing member fixedly attached to the primary shaft and an output gearing member fixedly attached to one transmission shaft of the plurality of transmission shafts of the accessory driven by the drive assembly,
wherein at least one of the gearing members of the primary angle gear and at least one of the drive assemblies have non-concurrent axes, and
wherein at least one of the drive assemblies comprises an angle gear comprising two gearing members comprising a worm and a wheel, and
wherein the accessory gearbox comprises a first accessory positioned at a first free end of the primary shaft, wherein the first accessory is arranged so as to extend toward the engine and to be positioned along a first lateral edge of the engine casing.

17. A turbomachine, comprising:
an engine casing,
an engine shaft, housed in the engine casing, said engine shaft defining an axis of rotation,
an accessory gearbox, positioned outside the engine casing, the accessory gearbox being connected to the engine shaft through a radial transmission shaft driven by the engine shaft forming an angle with the axis of rotation of the engine shaft,
a plurality of transmission shafts intended to mechanically drive the accessories, a primary shaft, extending substantially transversely to the axis of rotation of the engine shaft and driven by the radial transmission shaft through a primary angle gear, said primary angle gear comprising a primary gearing member mounted on the primary shaft, and
a plurality of mechanical drive assemblies of the transmission shafts, said drive assemblies being driven directly by the primary shaft and being configured so that the associated accessories extend in the upper portion and over at least one of the lateral edges of the engine casing,
wherein at least one of the drive assemblies comprises a secondary gearing member fixedly attached to the primary shaft and an output gearing member fixedly attached to one transmission shaft of the plurality of transmission shafts of the accessory driven by the drive assembly,
wherein at least one of the gearing members of the primary angle gear and at least one of the drive assemblies have non-concurrent axes, and
wherein the accessory gearbox comprises a box casing and the gearing members of the at least one drive assembly are attached to the box casing by at least two connecting members extending on either side of each gearing member, and
wherein the accessory gearbox comprises a first accessory positioned at a first free end of the primary shaft, wherein the first accessory is arranged so as to extend toward the engine and to be positioned along a first lateral edge of the engine casing.

* * * * *